United States Patent
Bodi Reddy et al.

(10) Patent No.: US 10,187,308 B2
(45) Date of Patent: Jan. 22, 2019

(54) VIRTUAL SWITCH ACCELERATION USING RESOURCE DIRECTOR TECHNOLOGY

(71) Applicant: Intel Corporation, Santa Clara, CA (US)

(72) Inventors: Bhanu Prakash Bodi Reddy, Shannon (IE); Jasvinder Singh, Shannon (IE); Antonio Fischetti, Limerick (IE)

(73) Assignee: Intel Corporation, Santa Clara, CA (US)

(*) Notice: Subject to any disclaimer, the term of this patent is extended or adjusted under 35 U.S.C. 154(b) by 114 days.

(21) Appl. No.: 15/353,329

(22) Filed: Nov. 16, 2016

(65) Prior Publication Data
US 2018/0097728 A1 Apr. 5, 2018

Related U.S. Application Data

(60) Provisional application No. 62/402,952, filed on Sep. 30, 2016.

(51) Int. Cl.
| | |
|---|---|
| *H04L 12/725* | (2013.01) |
| *H04L 12/741* | (2013.01) |
| *H04L 12/747* | (2013.01) |
| *H04L 12/931* | (2013.01) |

(52) U.S. Cl.
CPC ............ *H04L 45/745* (2013.01); *H04L 45/30* (2013.01); *H04L 45/742* (2013.01); *H04L 49/70* (2013.01)

(58) Field of Classification Search
None
See application file for complete search history.

(56) References Cited

U.S. PATENT DOCUMENTS

| | | | | |
|---|---|---|---|---|
| 7,277,399 B1 * | 10/2007 | Hughes, Jr. | ......... | G06F 12/0875 370/252 |
| 2009/0138683 A1 * | 5/2009 | Capps, Jr. | ........... | G06F 9/30101 712/220 |
| 2017/0289068 A1 * | 10/2017 | Palermo | .............. | H04L 49/9047 |

* cited by examiner

*Primary Examiner* — Christopher M Crutchfield
*Assistant Examiner* — Alan L Lindenbaum
(74) *Attorney, Agent, or Firm* — Barnes & Thornburg LLP

(57) ABSTRACT

A virtual switch configured to switch packets between virtual switch ports based on classifier sub-tables. The virtual switch reserves blocks of last level cache for classifier sub-table storage. The virtual switch also maintains a global sub-table priority map for the classifier sub-tables. The global sub-table priority map indicates usage frequency of each classifier sub-table when switching the packets between the ports. A sub-set of the classifier sub-tables with a highest usage frequency, according to the global sub-table priority map, are pre-fetched to the reserved blocks of the last level cache. By pre-fetching the most used classifier sub-tables, memory related bottlenecks are reduced when searching through classifier sub-tables. This mechanism increases processing speed when matching packets/flows to classifier sub-tables, resulting in faster packet switching by the virtual switch. The virtual switch may leverage Cache Allocation Technology (CAT)/Code and Data Prioritization technology (CDP) to prevent cache eviction.

25 Claims, 7 Drawing Sheets

|   | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|
| CoS[0]: Mask | X | X | X | X | X |   |   |   |   |   |   |   |   |   |   |   |   |   |   |   |
| CoS[1]: Mask |   |   |   |   |   | X | X | X | X | X |   |   |   |   |   |   |   |   |   |   |
| CoS[2]: Mask |   |   |   |   |   |   |   |   |   |   | X | X |   |   |   |   |   |   |   |   |
| CoS[3]: Mask |   |   |   |   |   |   |   |   |   |   |   |   | X | X | X | X | X | X |   |   |
| CoS[N]: Mask |   |   |   |   |   |   |   |   |   |   |   |   |   |   |   |   |   |   | X | X |

FIG. 5

VIRTUAL SWITCH ACCELERATION USING RESOURCE DIRECTOR TECHNOLOGY

CROSS-REFERENCES TO RELATED APPLICATIONS

The present application claims benefit from U.S. Provisional Patent Application Ser. No. 62/402,952, filed Sep. 30, 2016 by Bhanu Prakash Bodi Reddy et al., and entitled "Accelerating OVS Userspace Classifier Using RDT," which is incorporated herein by reference as if reproduced in its entirety.

BACKGROUND

Network switching is often negatively impacted by the noisy neighbor problem. A noisy neighbor is a data center co-tenant with signaling characteristics that monopolizes network bandwidth. A noisy neighbor can cause other tenants that share the network infrastructure to suffer from uneven network performance. For example, a first network function that continuously signals small bursts of unrelated data can repeatedly evict more heavily used data from shared fast access memory. The eviction may result in thrashing as the heavily used data is repeatedly stored and evicted from the shared memory. Memory thrashing in the shared memory can substantially negatively impact network performance of all network co-tenants that access the shared memory.

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

FIG. 5 is a table illustrating an example implementation of a Cache Allocation Technology (CAT) bit mask.

DETAILED DESCRIPTION OF THE DRAWINGS

Figure 1:
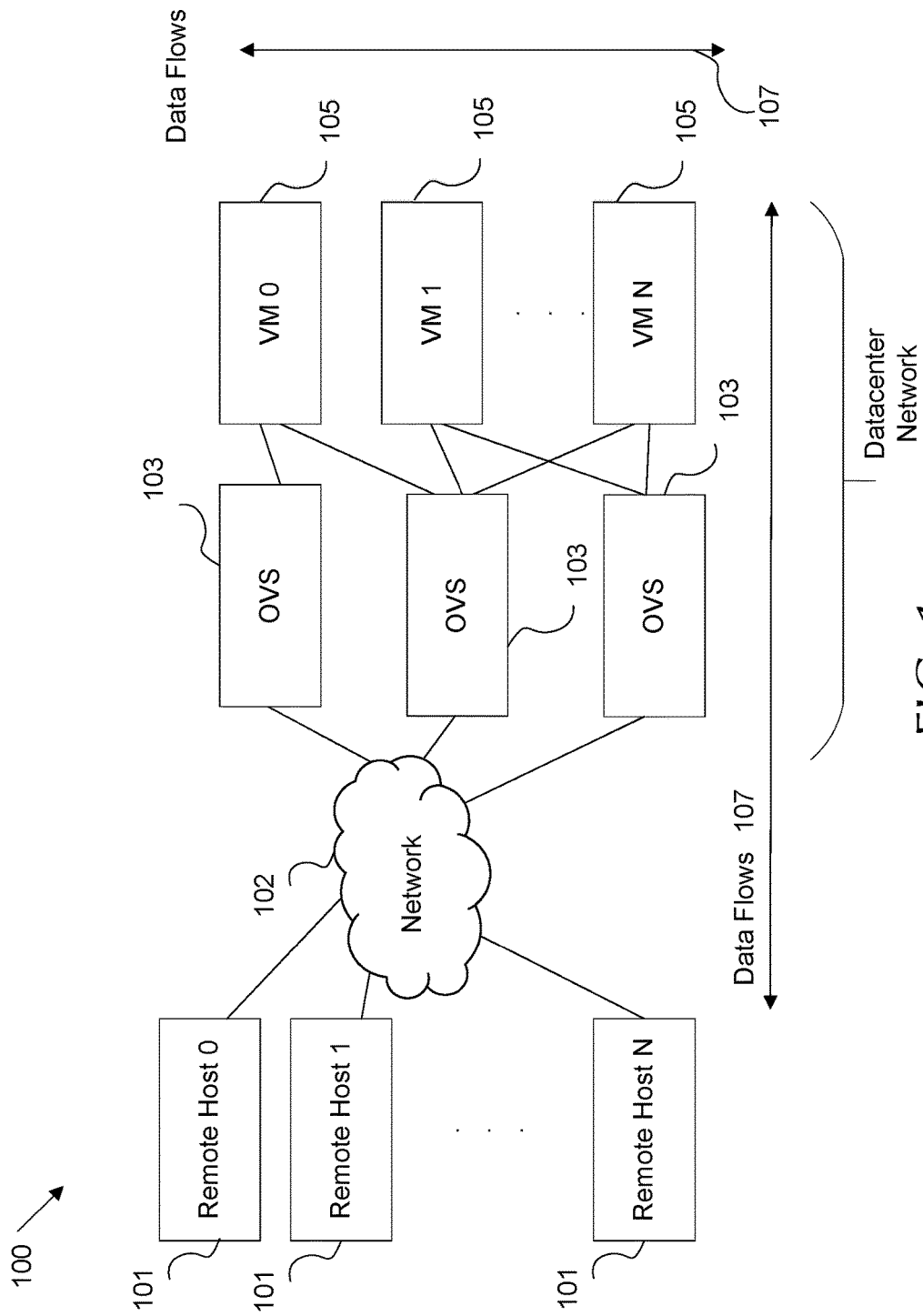
FIG. 1 is a block diagram of an embodiment of a network employing open virtual switching.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more non-transitory machine-readable (e.g., computer-readable) storage medium, which may be read and executed by one or more processors. A non-transitory machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A cloud network may be configured to switch packets using the Open vSwitch (OVS) open source standard. OVS is a virtual switching technology that supports packet switching in a virtualized network architecture. When performing packet switching, an OVS implementation compares each incoming packet to an exact match cache (EMC). If no entry is found, the OVS employs a classifier and searches through each classifier sub-table in memory until a match is found. If no match is found in the classifier sub-tables, the packet is switched by employing a much slower OpenFlow table (e.g. which may require additional signaling with an OpenFlow controller). EMC space is limited, so many packets of continuing flows are typically switched according to the classifier sub-tables. Classifier sub-tables are created dynamically at run-time based on the number of active packet flows. A classifier sub-table may be created for each set of flows sharing a common source and destination address, for example based on internet protocol (IP) address, media access control (MAC) address, etc. Many classifier sub-tables are created when thousands of active parallel flows are managed. Classifier sub-tables may be searched in a random order during switching. As such, classifier lookup speed decreases when noisy neighbor tenants create bursts of unrelated data repeatedly that evict more heavily used classifier sub-table entries, which results in longer memory access time. Further, non-switching processes may also share last level cache (LLC) memory with switching processes. Accordingly, classifier sub-tables employed for heavily used active flows may be continuously evicted from LLC by non-switching related processes. Repeated eviction of classifier sub-tables used for heavily used flows can result in a process bottleneck in LLC, which slows switch speed for all processes. A performance drop of about fifty percent may be observed when a packet is forwarded according to classifier sub-table instead of according to the EMC. While per port sub-table ranking and/or application of bloom filters/cuckoo filters may be employed to speed classifier sub-table selection, such mechanisms do not address the problem of cache eviction.

Disclosed herein are mechanisms to support improved OVS speed. The OVS maintains a global sub-table priority map. The global sub-table priority map ranks classifier sub-tables based on a frequency of hits, where a hit indicates the sub-table was selected as a match by the classifier for switching purposes. The OVS pre-fetches classifier sub-tables with a highest usage frequency (e.g. greatest number of hits/matches) and/or classifier sub-tables related to high priority flows to shared LLC. By pre-fetching the classifier sub-tables with a highest usage frequency, received packets are more likely to match a classifier sub-table already stored in memory. This mechanism speeds up the searching process. Further, employing Resource Director Technology (RDT) reduces the eviction of the data from the LLC. RDT may be a mechanism for monitoring and controlling allocation of system resources (e.g. hardware allocation to virtualized systems). RDT includes CAT and/or CDP. CAT is a mechanism to support virtual network component (e.g. Operating System (OS), hypervisor, Virtual Machine Manager (VMM), etc.) control of shared cache, for example via bit masks that allocate hardware memory to corresponding virtual components. CDP is a type of CAT that supports separate control over code and data in shared cache. RDT may be employed by the OVS, which performs switching by employing data plane development kit (DPDK) poll mode driver (PMD) threads to poll the ingress packets from the port. DPDK is a programming framework for high speed data packet networking applications. PMD threads are employed by DPDK, and operate on ingress packets without asynchronous notifications in order to reduce signaling overhead and increase switching speed. The OVS also maintains a port private map for each port. The port private map stores a classifier sub-table ranking and sorted map for the corresponding port to inform classifier sub-table search order. Priorities listed in the port private map may be employed to set priorities in the global sub-table priority map maintained at the PMD thread. In order to prevent eviction of classifier sub-tables from LLC, the PMD threads may be assigned to a high priority (e.g. highest) class of service and a corresponding bit mask by employing RDT. For example, the bit mask may be a CAT bit mask or a pair of CDP bit masks. By assigning a high class of service bit mask to the PMD threads, the classifier sub-tables pre-fetched into memory are not evicted from LLC by non-PMD threads also employing the LLC.

FIG. 1 is a block diagram of an embodiment of a network 100 employing open virtual switching. Network 100 includes a plurality of remote hosts 101 connected to a datacenter network via a network 102. The remote hosts 101 communicate with virtual machines (VMs) 105 acting as application servers. The data communicated is transmitting in streams of related data packets, which may be referred to as data flows 107. OVS 103 switches the flows 107 traversing between the remote hosts 101 and the VMs 105 as well as flows 107 traversing between the VMs 105.

Remote hosts 101 may be clients requesting services from VMs 105, such as video streaming, webserver requests, etc. In some embodiments, some of the remote hosts 101 may also be corresponding VMs/servers positioned in remote data center networks, for example when data is transferred between geographically remote data centers. Remote hosts 101 communicate with VMs 105 via network 102. Network 102 may include an access network between a residential client and an internet service provider, a wireless network such as a long term evolution (LTE) network, a core network between data centers, or some combination thereof. It should be noted that a large number of remote hosts 101 may communicate with some combinations of VMs 105 at any specified point in time. Further, such communications can change dynamically with drastically different switching and bandwidth requirements from one moment to the next.

VMs 105 are each emulations of computing systems and/or computing operating environments. VMs 105 may provide a wide variety of virtual network functions (VNFs) on behalf of network tenants. VMs 105 may operate on hypervisors installed on network servers. Further, the VMs 105 may be dynamically shifted in whole or in part between physical hardware based on the dynamically changing needs of the data center tenants and/or the requests of the remote hosts 101. Such shifting of hardware resources may be referred to as elastic provisioning and is employed in a cloud computing environment. The communications between the VMs 105 and/or between the VMs 105 and the remote hosts 101 may take place over virtual networks, such as virtual local area network (VLANs), virtual extensible local area networks (VXLANs), etc. It should be noted that other components may provide VNFs according various cloud computing paradigms, such as software as a service (SaaS), infrastructure as a service (IaaS), platform as a service (PaaS), etc. The present disclosure discusses communications in terms of VMs for purposes of simplicity and clarity, but is intended to include all such forms of virtualized machine components that provide VNFs.

Data flows 107 communicate data between the VMs 105 and/or between the VMs 105 and the remote hosts 101. Each data flow 107 is a series of data communication packets that are related in some fashion. For example, a data flow 107 may include a plurality of packets with a common source, a common destination, and be related to a common transaction. As a specific example, a data flow 107 may contain streaming video requested by a remote host 101 from a VM 105. In such case, the packets of the data flow 107 would each contain a portion of the video stream, which could then be combined and reproduced at the requesting remote host 101. Data flows 107 may also be short-lived and contain much less data in some cases. For example, a remote host 101 may make a request for data from a VM 105 as part of a data flow 107. For example, a remote host 101 could ask for the current time from a VM 105 acting as a time server. Further, VMs 105 may interact by communicating via data flows 107. For example, a first VM 105 acting as a webserver may request and receive data from another VM 105 acting as a database. Accordingly, data flows 107 in a data center network change dynamically and can be very difficult to predict in advance.

The OVS 103 embodies a virtual switching mechanism that switches received packets between OVS ports. An OVS 103 may provide network security, quality of service (QoS) traffic management, communication monitoring, automated traffic/system management, etc. For example, the OVS 103 are configured to switch packets of data flows 107 to maintain communications between the various VMs 105 and/or remote hosts 101 as discussed above. The OVS 103 may be implemented as a control stack for hardware switching (e.g. in a physical switch component) and/or as a virtual switch operating on a hypervisor in a server. The OVS 103 may also be distributed across a plurality of servers/hypervisors. Furthermore, a plurality of OVS 103 may me employed in the same datacenter. Also, the OVS 103 may operate on the same hardware in some cases. In addition, OVS 103 connections between VMs 105 and/or remote hosts 101 may change dynamically and rapidly at run time. Each OVS 103 may employ Openflow or other switching protocols as discussed in more detail below. For example, an OVS 103 may create flow tables for received packets (e.g. based on instruction from an OpenFlow controller) and may switch each incoming packet based on newly created flow tables and/or existing flow tables obtained from memory. As the data flows 107 change dynamically in unpredictable ways, the number of flow tables also change accordingly. When many thousands of data flows 107 traverse the OVS 103, many flow tables are created to support communication of the data traffic. Large numbers of flow tables can result in reducing switching speed when the OVS 103 searches through the set of tables to find a match, which is also known as a hit. As discussed below, switching speed may be increased by searching the flow tables in order of usage frequency. Switching speed may be further increased by pre-fetching flow tables to cache for faster access.

Figure 2:
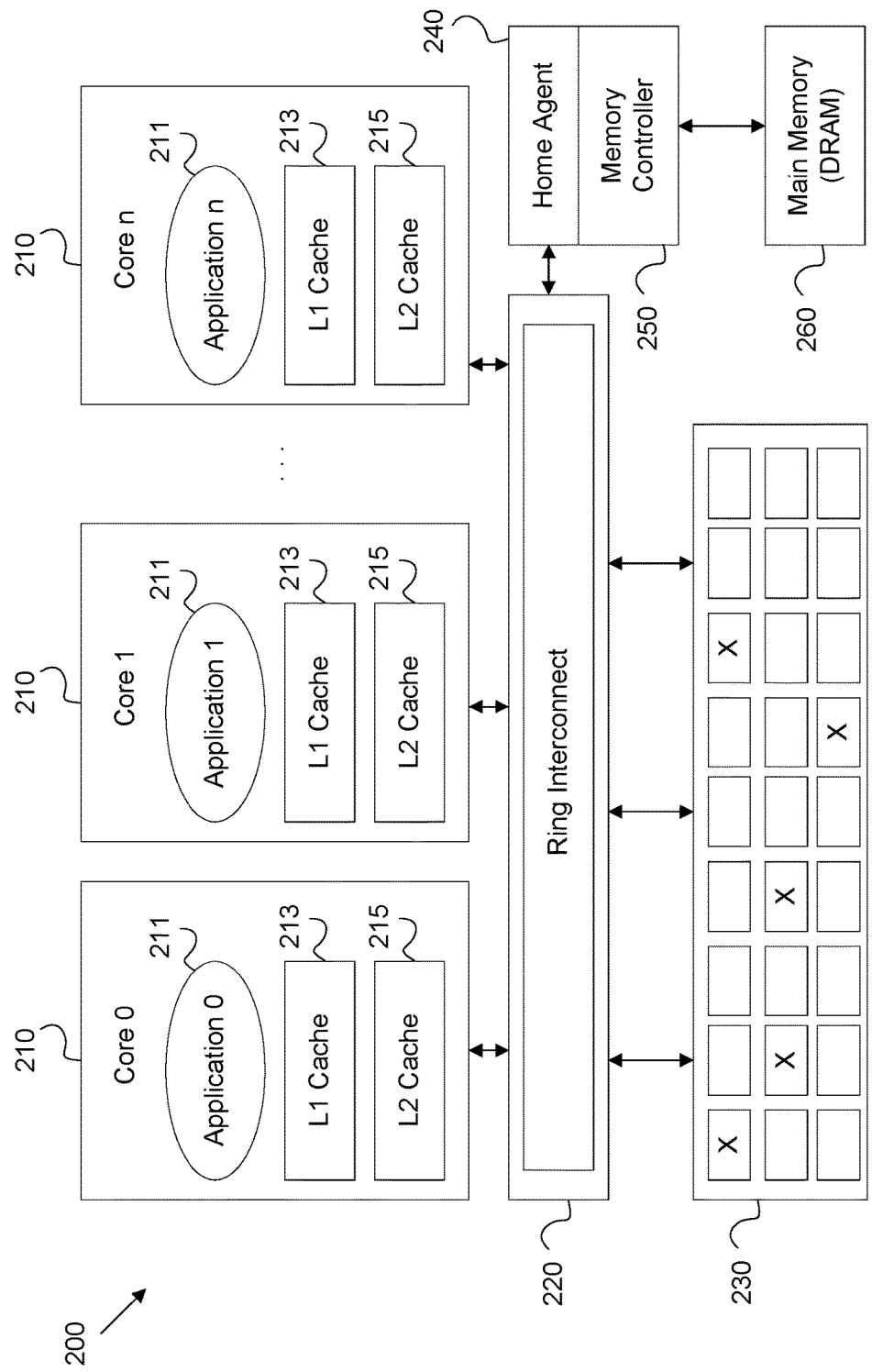
FIG. 2 is a block diagram of an embodiment of a hardware system for implementation of an open virtual switch (OVS).

FIG. 2 is a block diagram of an embodiment of a hardware system 200 for implementation of an open virtual switch (OVS), such as an OVS 103. System 300 includes a plurality of processor cores 210 coupled via to a shared LLC 230. The processor cores 210 may be coupled to the shared LLC 230 via a ring interconnect 220 or similar coupling. The shared LLC 230 stores data being actively processed by the cores 210 and is located in close physical proximity to the cores 210 to support fast memory access. System 200 further includes a home agent 240 and a memory controller 250 coupled to the ring interconnect 220 to support memory access. System 200 further includes main memory 260, which may include dynamic random access memory (DRAM) for storing data for use by the cores 210.

Cores 210 are general purpose processing units each known as a processor die. The cores 210 may implement the at least one virtual switch. The cores 210 are configured to execute instructions. For example, the cores 210 may obtain data and/or processing instructions from memory, such as the LLC and/or main memory 260. The cores 210 may forward data through a corresponding transistor network to process the data, for example via execution of corresponding instructions. The processed data and/or the results of the execution may then be stored back in memory. The cores 210 may also access other system components to operate a computer, for example by causing packets to be transmitted, displaying results to a user via a screen, activating peripheral hardware components, etc. Cores 210 process applications 211. Applications 211 include executable instructions organized into threads, where a thread is an executable task. Applications 211 include a wide variety of system 200 tasks and may be employed to implement a hypervisor, an OVS such as an OVS 103, a VM such as a VM 105, etc. By employing multi-threading techniques, a core 210 may execute more than one application at once, and hence can be configured to implement at least one OVS. Cores 210 may also include level 1 (L1) cache 213 and level 2 (L2) cache 215. L1 cache 213 and L2 cache 215 are memory units located on each core 210. L1 cache 213 is the small memory unit on a core 210 and is stored on the processor die in close proximity to corresponding computation logic. L2 cache 215 includes more memory space and is also positioned on the processor die, but is positioned farther away than L1 cache 213. Data used repeatedly by a core 210 during execution is stored closer to the logic circuits of the core 210 for increased access speed. However, proximity limits memory size, and hence limits how much data can be stored in L1 cache 213 and L2 cache 215. L1 cache 213 and L2 cache 215 are each dedicated to store data/instructions for the corresponding core 210 and are not shared between cores.

The ring interconnect 220 is a conductive data transmission and switching network. The ring interconnect 220 is configured to forward data between components. Further, the ring interconnect 220 includes various connection points that can forward data around the interconnect in a clockwise and/or counterclockwise direction or forward data to one or more components coupled to the connection point.

The shared LLC 230 is a memory storage unit shared by the cores 210. LLC 230 includes a plurality of blocks, which are used to store data/instructions during execution by the cores 210. The LLC 230 blocks may be dynamically allocated to specified cores 210 to prevent a first core 210 from overwriting a second core's 210 data. As an example, memory blocks allocated to core 0 in shared LLC 230 is depicted with Xs. The LLC 230 blocks receive and store data/instructions from the cores 210 and/or main memory 260 via the ring interconnect 220. The LLC 230 blocks also forward data across the ring interconnect 220 to the cores 210 and/or main memory 260 upon request.

The home agent 240 is a component on the central processing unit (CPU) package that is configured to manage a memory access protocol. The memory controller 250 is a component on the CPU package that is configured to communicate with main memory 260 based on the memory access protocol from the home agent. For example, the home agent 240 ensures coherency is maintained in main memory, manages memory request conflicts, manages the order of memory access requests, provides snoop directories, etc. The memory controller 250 translates the home agent's 240 commands into specific read/write requests to the main memory 260. The memory controller 250 also schedules such requests with respect to memory 260 timing. Accordingly, the home agent 240 and memory controller 250 operate together to fetch data from memory 260, and forward such data to the LLC 230 and/or cores 210 via the ring interconnect 220.

Cores 210 often operate on data that is too large to exists completely on LLC 230. Accordingly, system 100 is coupled to main memory 260. The main memory 260 is short term memory positioned off of the CPU package. The main memory 260 holds more data than the LLC 230, but is positioned farther away from the cores 210 than the LLC 230. Hence, main memory 260 has a slower access time than the LLC 230. Main memory 260 is also a shared memory space. For example, an application 211, an active application 211 function, and/or application 211 data may be stored in main memory 260. Portions of the active application 211/ data are communicated from main memory 260 to LLC 230, and vice versa, on an as needed basis, which allows the cores 210 to operate on data stored in the faster LLC 230 system. The data can then be fetched to L2 cache 215 or L1 cache 213 when the cores 210 are prepared to compute the data.

System 200 can implement an OVS as an application 211. An OVS may include multiple virtual ports corresponding to interfaces between applications 211 and/or corresponding to actual hardware ports between a server containing system 200 and an adjacent server. The OVS can determine how to switch the packets to packet destination based on flow tables stored in main memory. As discussed below, flow tables may include classifier sub-tables. The main memory 260 is configured to store the classifier sub-tables for at least one OVS. As noted above, the OVS main employ a large number of classifier sub-tables when thousands of flows are traversing the data center. Searching all the classifier sub-tables for a match to employ when switching may be time consuming. Each classifier sub-table may be fetched from main memory 260 into LLC 230, searched, and then evicted if the classifier sub-table is not a match for the packet. As such, LLC 230 size (e.g. in memory blocks) and fetch time may become a bottleneck, which acts as a limiting factor affecting processing speed when switching packets by the OVS.

However, some data flows may reliably require more switching than others. Accordingly, the OVS can be sped up by pre-fetching classifier sub-tables that repeatedly match packets to LLC 230. For example, a data flow that transmits a large amount of consistent data may repeatedly traverse the OVS. By maintaining a corresponding classifier sub-table in LLC 230, the process of switching those packets can be sped up, which can increase overall switching speed of the OVS.

Figure 3:
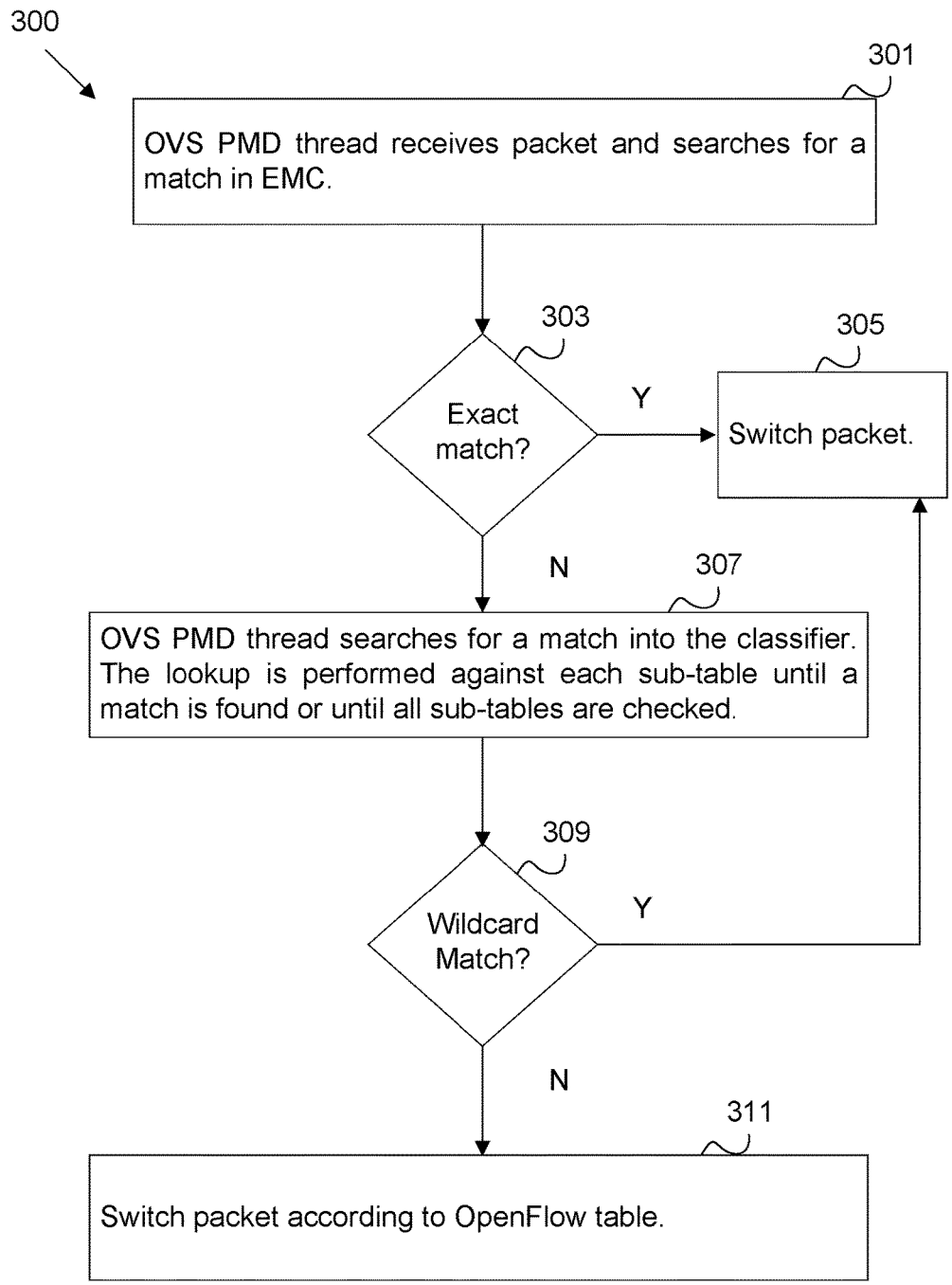
FIG. 3 is a flow diagram of an embodiment of a method of packet switching by an OVS according to an Openflow protocol.

FIG. 3 is a flow diagram of an embodiment of a method 300 of packet switching by an OVS, such as an OVS 103 in a network 100 as implemented by a system 200, according to an Openflow protocol. At block 301, an OVS PMD thread receives a packet. An OVS PMD thread is an execution thread that implements OVS switching functionality by polling OVS ports for incoming packets (e.g. instead of waiting for a protocol stack based interrupt to indicate a received packet). The OVS PMD thread reviews the packet's header field information in an attempt to match the packet to a known flow by searching for a match in the EMC. For example, the OVS PMD thread may review the packet's header fields, which may include source IP address, source MAC address, destination IP address, destination MAC address, virtual network identifiers such as VLAN/VXLAN tags, etc. The packet's header field information is first compared to an EMC. The EMC contains OVS port switching information for the most recently encountered flows. The EMC may contain a maximum of 8192 entries. As such, the EMC may quickly fill up when many thousands of parallel flows are traversing the OVS.

At block 303, the OVS PMD thread searches for a match into the classifier in order to determines whether there is an exact match between the packet header fields and any entry in the EMC. The lookup is performed against each sub-table until a match is found or until all sub-tables are checked. If an exact match is found, the packet is switched by the OVS thread at block 305. If no exact match is found, the method 300 proceeds to block 307. Failure to find an exact match at block 303 could mean that the packet is part of a new flow or could mean that the flow is not encountered often enough to maintain a position in the EMC. It should be noted that switching according to the EMC occurs quickly, while failure to switch based on the EMC may result in a fifty percent reduction in OVS switching speed.

At block 307, the OVS PMD thread employs a Datapath Classifier (DPCLS) to compare the packet header field information to classifier sub-tables. The classifier employs classifier sub-tables implemented as hash tables with a tuple search space. The thread compares a hash of the packet's header field information to hashes for each classifier sub-table to determine if a match is found. The classifier sub-tables may be randomly ordered and may be dynamically created and destroyed at runtime. Accordingly, the sub-tables are sequentially searched until a match is found or until all sub-tables are checked. Classifier sub-tables are unique and non-overlapping, so additional searching is unnecessary after a match is found. It should be noted that each unique flow encountered by the OVS may result in the creation of a classifier sub-table. As such, checking each classifier sub-table may slow the OVS considerably. Further, as noted above, the OVS may interact with thousands of flows and may constantly overfill the EMC. This may result in a large percentage of flows that are not represented in the EMC. Thus, a large percentage of incoming packets are checked against a large number of the classifier sub-tables, rendering search speed of the classifier a major limiting factor on the overall speed of the OVS.

At block 309, the method 300 determines whether there is a wildcard based match between the packet header fields and the classifier sub-tables. The wildcard usage allows matches when some, but not all, of the packet's header information matches the classifier sub-table information. If a match occurs, the OVS switches the packet at block 305. If no match occurs, the method 300 proceeds to block 311. At block 311, the packet is switched according to an Openflow table. Switching according to an Openflow table may occur for a newly encountered flow and may involve communication with an Openflow controller to determine switching instructions. Accordingly, switching via the Openflow table at block 311 may be a slower processing path for an OVS, but is less common than block 307, as block 311 is mainly used for new flows. As such, block 311 search speed may have less of an overall impact on OVS speed than block 307. Thus, pre-fetching high usage frequency classifier sub-tables into LLC may accelerate the execution speed of block 307, and therefore significantly increase overall OVS switching performance/speed.

Figure 4:
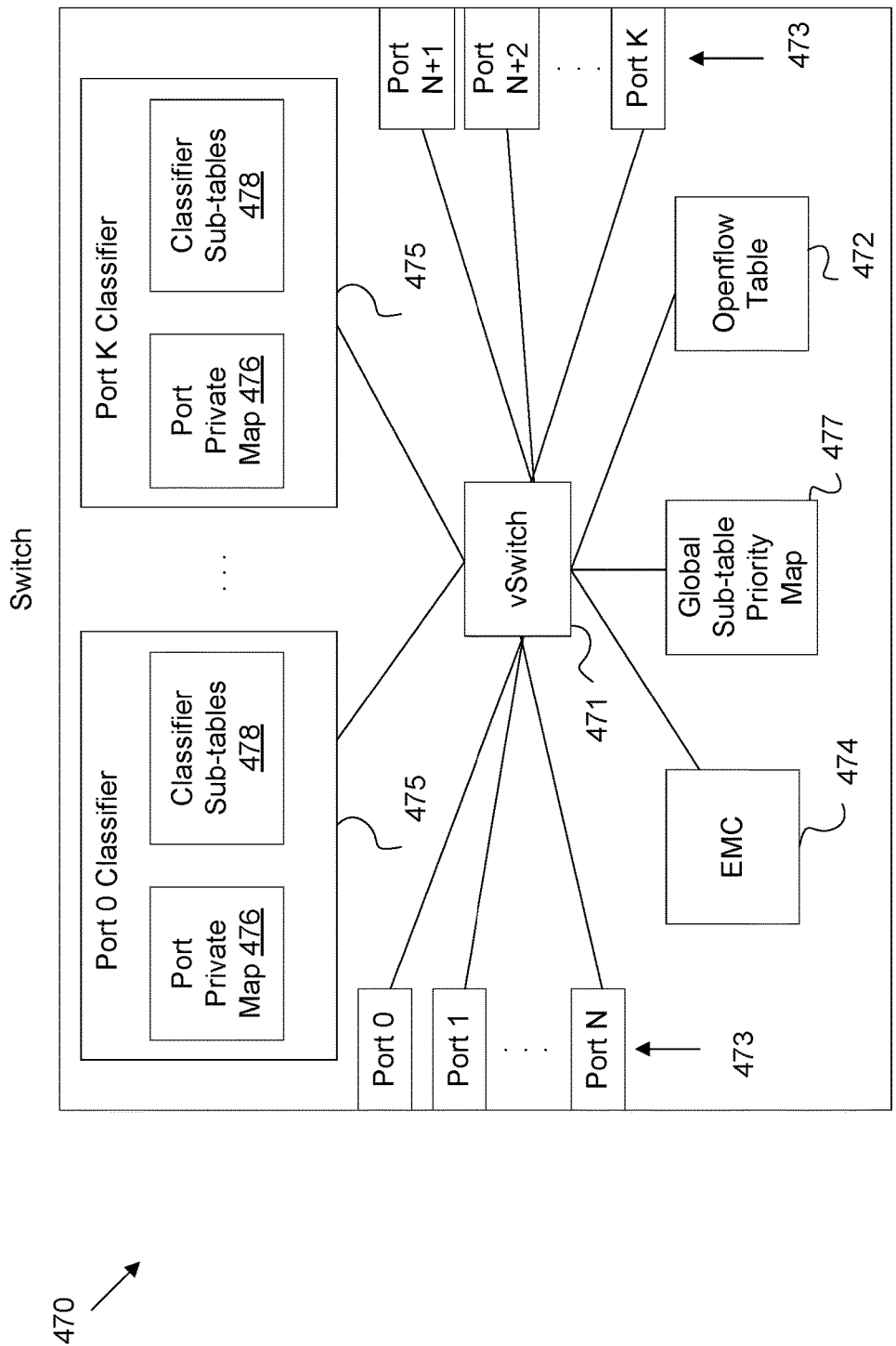
FIG. 4 is a block diagram of an embodiment of an OVS.

FIG. 4 is a block diagram of an embodiment of a switch 470. In some embodiments, the switch 470 may be substantially similar to OVS 103, may be implemented on a system of processor cores such as system 200, and may employ a switching method such as method 300. One of ordinary skill in the art will understand that a switch, such as switch 470, may be implemented in many different forms. Hence, switch 470 is described as employing features as described in OVS 103, system 200, and method 300 for purposes of clarity. However, switch 470 is not intended to be limited to such embodiments, and should be considered as described herein along with all equivalent embodiments. Switch 470 includes a plurality of ports 473. The switch 470 includes a virtual switch (vSwitch) 471 configured to switch packets between the ports 473 based on the EMC 474, classifier sub-tables 478, and OpenFlow table 472 (e.g. as discussed with respect to method 300). To support pre-fetching of high usage frequency classifier sub-tables 478, the vSwitch 471 employs a global sub-table priority map 477 indicating the sub-tables in the order of their usage. The global sub-table is built using port private maps 746 which show the order of the sub-tables usage for the respective port 473.

The vSwitch 471 is a logic switching fabric configured to switch packets between ports 473 to allow data flows, such as data flows 107, to move between VMs (e.g. VMs 105) and/or between VMs and remote hosts (e.g. remote hosts 101). The vSwitch 471 may operate on a hypervisor on a server, may be distributed across a plurality of servers/hypervisors, and/or may be implemented as control logic on a hardware switch in a data center, such as a top of rack (ToR) switch, and end of row (EoR) switch, etc. Accordingly, the vSwitch 471 may be distributed across multiple processor cores, such as cores 210.

Ports 473 may include physical connections, a mapping between a logic connection and a physical connection, and/or a mapping serving as an interface between multiple VMs operating in distinct operating environments. The switch 470 may include any desired number of upstream and/or downstream ports 473.

The switch 470 includes the EMC 474. EMC 474 is a table that may include about 8192 entries. vSwitch 471 may update EMC 474 with packet header data for flows that are recently switched by the vSwitch 471. The vSwitch 471 may also update the EMC 474 with corresponding port switching information. For example, the EMC 474 may be updated to include an entry indicating a packet with specified header information should be switched between a specified source port (e.g. Port N) and a specified destination port (e.g. port N+2). The vSwitch 471 may search the EMC 474 (e.g. as discussed in block 301 in FIG. 3) and switch packets between the ports 473 when a match is found based on the port switching information corresponding to the matched entry.

The switch 470 also includes the Openflow table 472. Openflow table 472 is structured according to the OpenFlow protocol and provides information sufficient for vSwitch 471 to obtain switching information for a packet when no match is found in the EMC 474 or by a classifier 475 (e.g. as discussed with respect to block 311 in FIG. 3). The OpenFlow table is a table populated with flow definitions and switching rules. Such definitions and rules may be set by an OpenFlow controller or a system administrator. For example, Openflow table 472 may be populated with information indicating an OpenFlow controller to be contacted when a packet is received as part of a newly received flow and/or when a packet cannot be matched to a known flow by other mechanisms.

Classifier 475 is employed when an exact match is not found in the EMC 472 (e.g. as discussed with respect to block 307 in FIG. 3). Classifier 475 is search logic employed by vSwitch 471 to classify a packet to a data flow by employing hashing and/or search wildcards when an exact match is not found. Classifier 475 maintains classifier sub-tables 478, which are switching tables that include an entry for each unique flow known to the vSwitch 471 and corresponding switching information. Classifier sub-tables 478 may be implemented as search tuple based hash values. As noted above, classifier sub-tables 478 may be unordered. Further, classifier sub-tables 478 may include many thousands of entries when many thousands of parallel flows traverse the vSwitch 471. As such, a complete search over all the classifier sub-tables 478 for each incoming packet may reduce classifier 475 search speed and hence vSwitch 471 switching speed.

Classifier 475 further includes and maintains a plurality of port private maps 476. Each port private map 476 corresponds to one of the ports 473. The port private maps 476 maintain a sub-table ranking indicating usage frequency (e.g. access by DPCLS) for each of the classifier sub-tables 478 when switching the packets across the corresponding port 473. Usage frequency indicates the number of matches/hits for a corresponding sub-table over time. The port private maps 476 may further include a sorted map based on the sub-table ranking for the corresponding port. The sorted map indicates a search order for the classifier sub-tables 478 when switching the packets across the corresponding port. Accordingly, the port private map 476 provides a search order for the classifier sub-tables 478 on a per-port 473 basis. The sub-table ranking and sorted map are updated periodically to ensure that the sub-table 478 with the most hits is searched first, the second most hits is searched second, etc. For example, when a packet is received on port N+2, the classifier 475 may obtain the port private map 467 for port N+2 to determine a search order for the classifier sub-tables 478 corresponding to port N+2. As packets coming from the same port are likely to always hit the same sub-table 478, or a small subset of sub-tables 478, the ordered search based on hit frequency reduces the time to find the matching sub-table 478. The port private maps 476 may also include priority information for VNFs corresponding to each flow, which may allow priority workloads to be prioritized over other flows.

Classifier 475 further maintains a global sub-table priority map 477 for the classifier sub-tables 478. The global sub-table priority map 477 indicates usage frequency (e.g. match/hit frequency) of each classifier sub-table 478 when packets are switched by the vSwitch 471 between the ports 473. Unlike the port private maps 476, the global sub-table priority map 477 indicates aggregate usage frequency of the classifier sub-tables 478 across all OVS ports 473. The global sub-table priority map 477 may further include priority information for VNFs corresponding to each flow. The global sub-table priority map 477 rankings and/or priorities are updated periodically based on classifier sub-table 478 hits and/or based on port private map 476 sub-table rankings.

Figure 6:
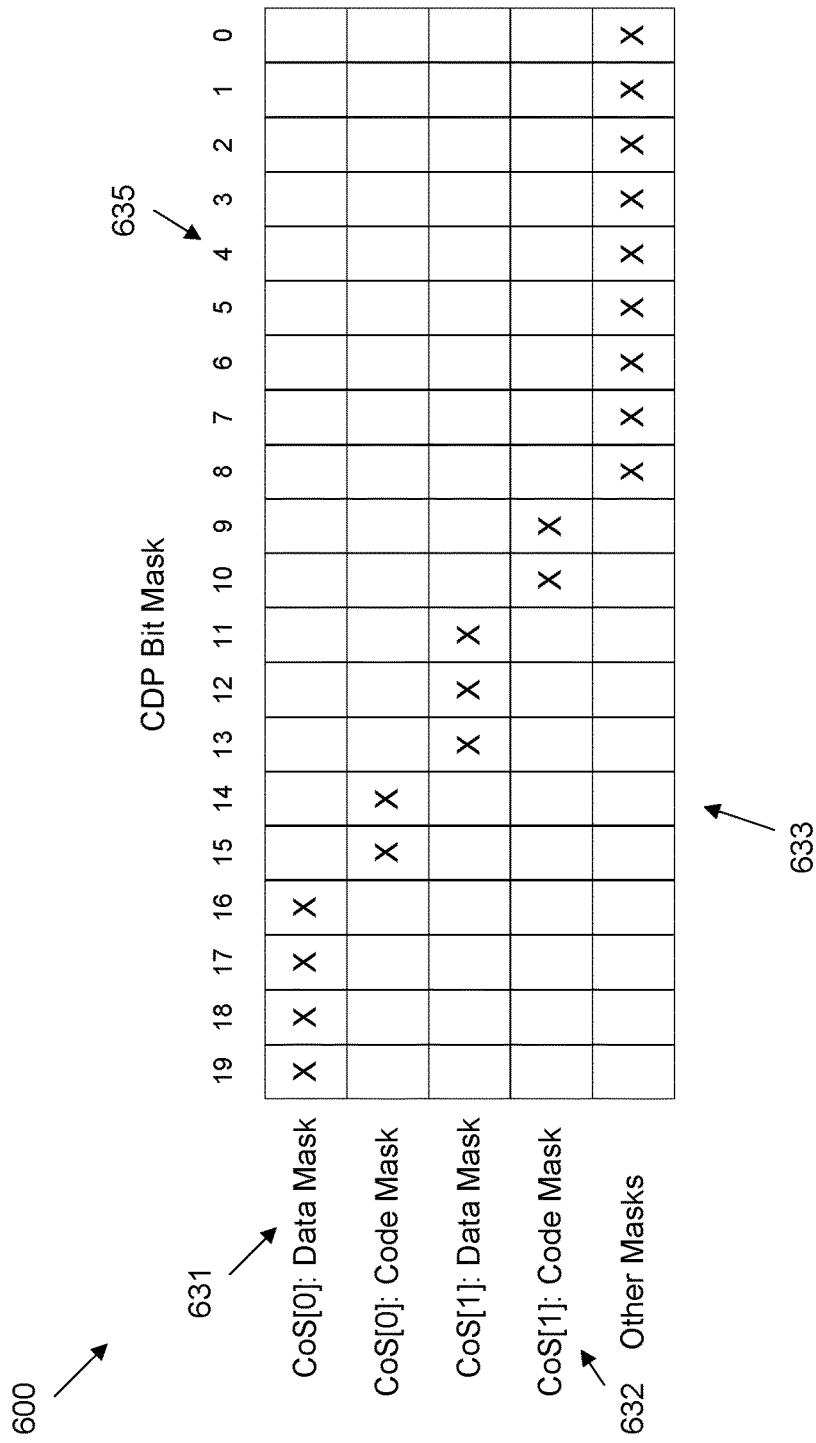
FIG. 6 is a table illustrating an example implementation of a Code and Data Prioritization technology (CDP) bit mask.

While private port private maps 476 support search order to speed searches of the classifier sub-tables, global sub-table priority map 477 supports hardware acceleration. The global sub-table priority map 477 rankings may be based on the private port private map 476 rankings. The global sub-table priority map 477 may be used to determine the classifier sub-tables 478 with the high (e.g. highest) usage frequency across all ports 473. As noted with respect to FIG. 2, multiple cores may execute multiple switches 470 and share the same LLC memory space. Further, the cores may employ the memory space in the LLC when searching through the classifier sub-tables 475. In order to accelerate the search process, the switch 470 is configured to reserve blocks of the last level cache for classifier sub-table 478 storage. The blocks may be referred to as reserved blocks for clarity of discussion. The switch 470 and/or the classifier 475 employ the global sub-table priority map 477 to determine the classifier sub-tables 478 with the highest usage frequency. The switch 470 and/or the classifier 475 may then pre-fetch the sub-set of the classifier sub-tables 478 with the highest usage frequency, according to the global sub-table priority map 477, to the reserved blocks of the LLC. In embodiments where the global sub-table priority map 477 also includes flow/VNF priority, the classifier sub-tables 478 can be pre-fetched according to both usage frequency and priority in order to priority search speed for prioritized workloads. By pre-fetching the most used classifier sub-tables 478 into the LLC, the most searched classifier sub-tables 478 are maintained in memory, which prevents the need to repeatedly fetch such tables from main memory and reduces search time. Further, by pre-fetching the most used classifier sub-tables 478 into a reserved portion of the LLC, the most searched classifier sub-tables 478 are not evicted from LLC by other cores/threads, which prevents thrashing. Further, the OVS PMD threads operating the switch 470 can be isolated to specific cores by employing a CPU scheduler. For example, the threads can be isolated by employing an isolate CPU (isolcpus) command in a corresponding operating system kernel. Isolating the cores to operate specified PMD threads prevents context switching, and hence further helps prevent eviction of the corresponding classifier sub-tables 478 from LLC. Reserving memory blocks of the LLC for use by the highest usage frequency classifier sub-tables 478 can be accomplished, for example, by employing cache bit masks via RDT. RDT includes CAT bit masks and CDP bit masks, as shown in FIGS. 5 and 6, respectively.

FIG. 5 is a table illustrating an example implementation of a CAT bit mask 500. CAT bit mask 500 is applied to shared cache, such as LLC 230. The shared cache includes memory blocks 533. Each memory block 533 is associated with an index 535. The index 535 indicates the physical location of the corresponding memory block 533. In CAT, each thread and related instructions and data are associated with a class of service (CoS). CoS indicates priority of the associated threads. For example, CoS may indicate thread processing priority from zero to N, where N is four or greater, with CoS[0] having the highest priority and CoS[N] having the lowest priority. Each CoS is associated with a CoS bit mask 531. The CoS bit mask 531 indicates the memory blocks 533 that can be used for storing instructions and data for threads with the corresponding CoS. Example CoS bit masks 531 are depicted with Xs to indicate the memory blocks 533 that can be used for storage by corresponding CoS based on index 535. As such, blocks 533 of an LLC, such as LLC 230, are reserved by employing a bit mask 531 for each CoS.

CAT bit mask 500 may be employed by an OVS such as OVS 103 and/or 470 to reserve memory blocks 533 in an LLC, such as LLC 230. For example, the OVS may employ a plurality of PMD threads corresponding to the ports for switching the packets. The processor cores (e.g. cores 210) may execute threads based on COS. Accordingly, the PMD threads may be assigned a CoS, for example CoS[0] and the corresponding bit mask 531. Non-PMD threads, such as Quick Emulator (QEMU) Input/Output (TO) threads are assigned lower CoS than PMD threads. A QEMU IO thread is a hypervisor thread that emulates IO hardware through virtualization. For example, the QEMU IO threads are assigned CoS[1] and the corresponding bit mask 531. By employing a higher CoS for the PMD threads, the hypervisor threads do not have access to the memory blocks 533 associated with the CoS[0] bit mask 531. Hence, the hypervisor, and all lower CoS threads, are unable to evict data used by the PMD threads when performing other tasks. As such, assigning the PMD threads the highest CoS and the highest CoS bit mask 531 prevents eviction of pre-fetched classifier sub-tables from the reserved memory blocks 533 of the last level cache by non-PMD threads. Further, the PMD threads are provided access to the reserved blocks 533 by associating the PMD threads with the highest CoS bit mask 531, depicted as example bit mask 531 CoS[0].

In addition, CAT may be employed to manage cache partitioning and dynamic memory block resource reassignment at run time. For example, the CoS[0] bit mask 531 may be altered to include greater or fewer memory blocks based on statistics from a global sub-table priority map and/or port private maps, such as global sub-table priority map and/or port private maps, respectively. When data flows are consistently handled by the EMC or classified to a small number of classifier sub-tables, the CoS[0] bit mask 531 may be reduced to allocate less cache to the PMD threads. When data flows are consistently missing in the EMC and are returning matches in a wide variety of classifier sub-tables, the CoS[0] bit mask 531 may be increased to allocate more cache to the PMD threads.

FIG. 6 is a table illustrating an example implementation of a CDP bit mask 600. CDP bit mask 600 may be employed by an OVS such as OVS 103 and/or 470 to reserve memory blocks 633 in an LLC, such as LLC 230. CDP bit mask 600 is similar to CAT bit mask 500, but includes separate CoS code bit masks 632 and CoS data bit masks 631 for reserving thread execution code and thread data, respectively. Bit masks 631-632 reserve memory blocks 633 by index 635, which are similar to memory blocks 533 and index 535, respectively. Accordingly, CDP bit mask 600 reserves memory blocks 633 of an LLC by employing code bit masks 632 and data bit masks 631 for each CoS. As with CAT bit mask 500, the PMD threads are associated with a highest CoS to prevent eviction of pre-fetched classifier sub-tables from the reserved memory blocks 633 of the last level cache by non-PMD threads. The OVS PMD threads are provided access to the reserved memory blocks 633 by associating the PMD threads with the highest CoS code bit mask 632 (e.g. CoS[0] code mask). The OVS PMD threads are further provided access to reserved memory blocks 633 by associating the pre-fetched classifier sub-tables with the highest CoS data bit mask 631 (e.g. CoS[0] data mask). CDP bit mask 600 may also be dynamically adjusted at run time to increase or decrease the amount of cache reserved for the PMD threads in a similar manner to CAT bit mask 500. In order to adjust the CDP bit mask 600 to manage cache partitioning, both the code bit masks 632 and data bit masks 631 are increased or decreased as desired based on statistics from a global sub-table priority map and/or port private maps, such as global sub-table priority map and/or port private maps, respectively.

Figure 7:
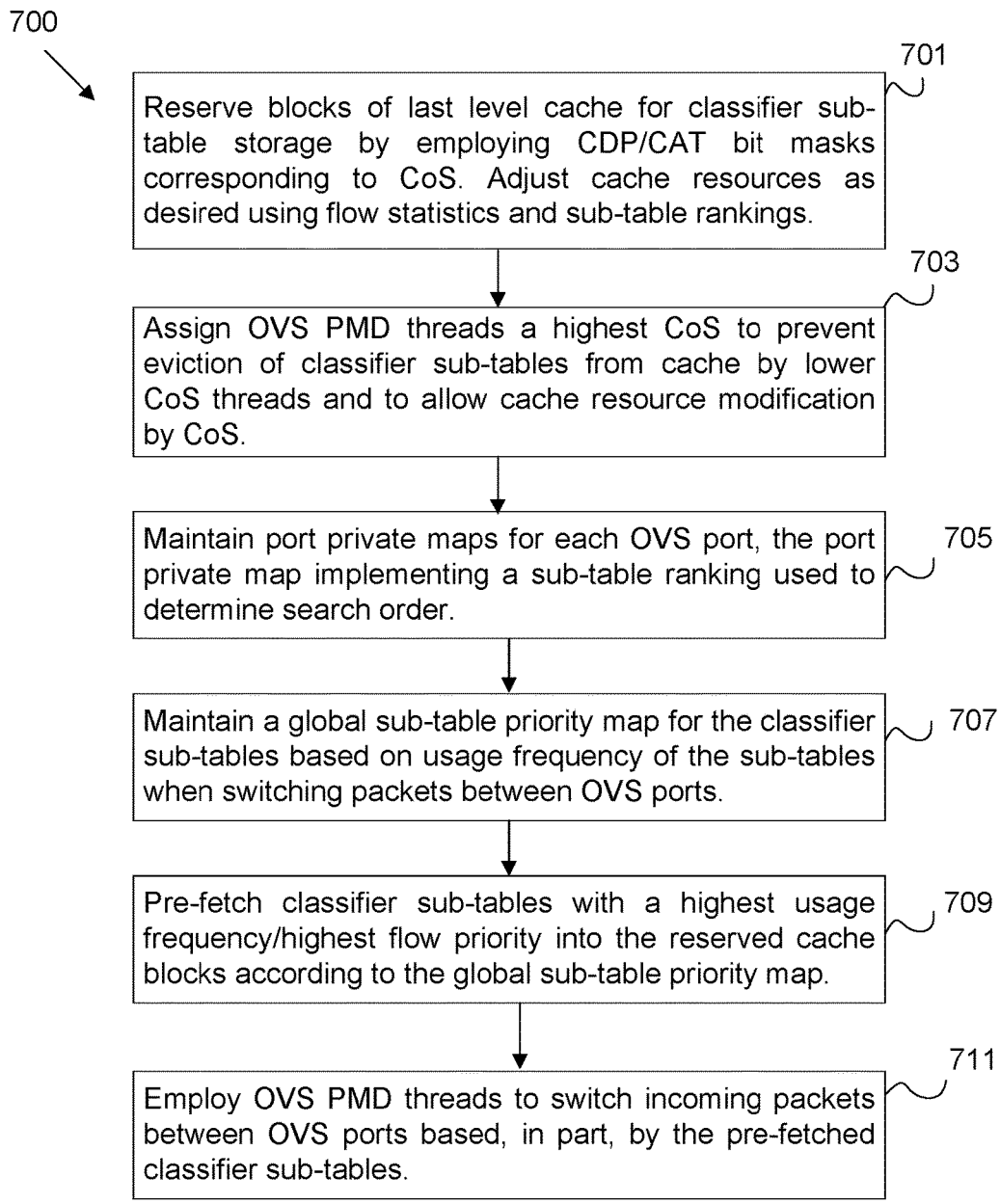
FIG. 7 is a flow diagram of an embodiment of a method for pre-fetching classifier sub-tables for use by an OVS.

FIG. 7 is a flow diagram of an embodiment of a method 700 for pre-fetching classifier sub-tables for use by an OVS, such as classifier sub-tables 478 and OVS 103 and/or 470, respectively. The classifier sub-tables can then be employed for switching packets from data flows, such as data flows 107 by a virtual switch operating on a hardware system such as system 200. Switching may occur according to a method such as method 200. The pre-fetched classifier sub-tables can be maintained in reserved memory for increased switching speed by employing a CoS based bit mask mechanism, such as bit masks 500 and/or 600. Method 700 may be executed by a processor, for example by executing instructions stored on a non-transitory computer readable storage medium.

At block 701, memory bocks of the LLC are reserved for classifier sub-table storage. The memory blocks are reserved based on CoS by employing CoS based CAT and/or CDP bit masks corresponding to a highest Cos as discussed with respect to FIGS. 5 and 6, respectively. The memory block reservation may be initiated by the OVS, the hypervisor, the processor cores, etc. As discussed above, in CAT, PMD threads and pre-fetched classifier sub-tables are assigned a highest CoS bit mask. In CDP, PMD threads are assigned a highest CoS code bit mask and pre-fetched classifier sub-tables are assigned a highest CoS data bit mask. Further, cache resources may be dynamically adjusted at run-time as desired, for example by altering CAT and/or CDP bit masks to change the number of reserved memory blocks in LLC. Such cache resource adjustments may be made based on data flow statistics and rankings stored in the global sub-table priority map and/or port private maps.

At block 703, PMD threads, which implement OVS switching, are assigned a highest CoS and corresponding highest CoS bit mask to prevent eviction of classifier sub-tables from the reserved memory blocks of LLC by lower CoS non PMD threads (e.g. hypervisor threads, etc.) This allows cache resource modification by CoS. It should be noted that non-PMD threads may also be employed to execute non-switching VNFs, such as hypervisor execution, system maintenance, VM operations, etc. Accordingly, the PMD threads are assigned a higher CoS than the non-PMD threads. By assigning a higher CoS to the PMD threads than the non-PMD threads, the non-PMD threads with the lower CoS are prevented from evicting pre-fetched classifier sub-tables associated with the higher CoS PMD threads. Further, assigning the PMD threads to the highest CoS allows the memory blocks reserved at block 701 for the PMD threads to be dynamically altered at run-time depending on the changing workload dynamics of the system. Accordingly, LLC allocation for the PMD threads can be increased or decreased as desired to support storing classifier sub-tables for the PMD threads.

At block 705, port private maps are maintained for each OVS port. The port private maps implement a sub-table ranking used to determine search order. For example, each port private map includes a classifier sub-table ranking for the corresponding port, which results in per port classifier sub-table rankings. The classifier sub-table ranking indicates usage frequency of the classifier sub-tables when switching the packets across the corresponding OVS port. Further, each port private map includes a sorted map based on the sub-table ranking for the corresponding port. The sorted map indicates a search order for the classifier sub-tables when switching the packets across the corresponding port. The port private map's sorted map provides a classifier sub-table search order for the corresponding port, which results in per port classifier sub-table search orders. It should be noted that the global sub-table priority map is updated based on the classifier sub-table rankings and/or sorted maps of the port private maps. Accordingly, changes in the port private maps can adjust which classifier sub-tables are pre-fetched and stored in the reserved blocks of LLC.

At block 707, a global sub-table priority map, such as global sub-table priority map 477, is maintained for the classifier sub-tables. The global sub-table priority map is updated periodically to rank the classifier sub-tables based on usage frequency of each sub-table when switching the packets between OVS ports. The global sub-table priority map indicates usage frequency, which indicates the number of times per time period that a corresponding classifier sub-table returns a match/hit when the OVS searches the classifier sub-tables when switching packets between OVS ports. The rankings of the global sub-table priority map may also be adjusted by flow priority of the corresponding classifier sub-table. Such ranking adjustment allows the OVS to employ the global sub-table priority map to prioritize packet flows by pre-fetching based on both usage frequency and packet flow priority.

At block 709, a subset of the classifier sub-tables with a highest usage frequency and/or highest flow priority are pre-fetched into the reserved LLC blocks. The pre-fetched classifier sub-tables may be positioned in the memory blocks corresponding to the highest CoS bit mask assigned to the PMD threads. The classifier sub-tables usage frequency/flow priority is determined according to the global sub-table priority map. The classifier sub-tables are selected for pre-fetching, according to the global sub-table priority map, based on frequency of use when switching the packets according to corresponding flows.

At block 711, the PMD threads are employed to switch incoming packets between OVS ports based, in part, by the pre-fetched classifier sub-tables. For example, packets from data flows (e.g. data flows 107) are received on a first set of OVS ports (e.g. ports 473) and are switched to a second set of OVS ports for transmission to one or more VMs and/or remote hosts. Such switching may employ a three tier process, such as method 300, based on an EMC, a classifier, and/or an OpenFlow table, such as EMC 474, classifier 475, and OpenFlow table 472, respectively. The PMD threads, operating on cores such as cores 210, switch some packets based on the EMC, some packets based on the classfier and corresponding sub-tables, and some packets based on the OpenFlow table. By pre-fetching the classifier sub-tables with the highest usage frequency to reserved memory in LLC (e.g. LLC 230) and maintaining such classifier sub-tables in memory by employing CAT/CDP bit masks, such as bit masks 500 and/or 600, the speed of switching packets by the classifier is increased, resulting in increased switching speed for the OVS.

It should be noted that method 700 may operate continuously. While method 700 blocks are shown in an example order for clarity of discussion, method 700 may be performed in any order and/or substantially simultaneously.

EXAMPLES

Illustrative examples of the technologies disclosed herein are provided below. An embodiment of the technologies may include any one or more, and any combination of, the examples described below.

Example 1 includes an apparatus comprising: a main memory configured to store classifier sub-tables for at least one virtual switch; a last level cache; and one or more processor cores to implement the at least one virtual switch with a plurality of ports, the processor cores to: switch packets between the ports based on the classifier sub-tables; reserve reserved blocks of the last level cache for classifier sub-table storage; maintain a global sub-table priority map for the classifier sub-tables, the global sub-table priority map indicating usage frequency of the classifier sub-tables when switching the packets between the ports; and pre-fetch a sub-set of the classifier sub-tables with a highest usage frequency, according to the global sub-table priority map, to the reserved blocks of the last level cache.

Example 2 includes the subject matter of Example 1, and wherein the processor cores are further to maintain a plurality of port private maps, the port private maps including a sub-table ranking indicating usage frequency of the classifier sub-tables when switching the packets across a corresponding port.

Example 3 includes the subject matter of Examples 1-2, and wherein the processor cores employ a plurality of PMD threads corresponding to the ports for switching the packets, wherein the processor cores execute threads based on class of service, and wherein the PMD threads are assigned a highest class of service to prevent eviction of pre-fetched classifier sub-tables from the reserved blocks of the last level cache by non-PMD threads.

Example 4 includes the subject matter of Example 3, and wherein blocks of the last level cache are reserved by employing a bit mask for each class of service, and wherein the PMD threads are provided access to the reserved blocks by associating the PMD threads with a highest class of service bit mask.

Example 5 includes the subject matter of Example 3, and wherein blocks of the last level cache are reserved by employing a code bit mask and a data bit mask for each class of service, and wherein the PMD threads are provided access to the reserved blocks by: associating the PMD threads with a highest class of service code bit mask, and associating the classifier sub-tables with a highest class of service data bit mask.

Example 6 includes the subject matter of Examples 3-5, and wherein the processor cores further dynamically adjust a number of reserved memory blocks for classifier sub-table storage based on flow statistics associated with the switched packets by altering a bit mask associated with the highest class of service assigned to the PMD threads.

Example 7 includes the subject matter of Examples 1-6, and wherein the global sub-table priority map further includes VNF priority, and wherein the sub-set of the classifier sub-tables are pre-fetched according to both usage frequency and VNF priority.

Example 8 includes a comprising: switching packets between virtual switch ports based on classifier sub-tables; reserving blocks of last level cache for classifier sub-table storage; maintaining a global sub-table priority map for the classifier sub-tables, the global sub-table priority map indicating usage frequency of the classifier sub-tables when switching the packets between the ports; and pre-fetching a sub-set of the classifier sub-tables with a highest usage frequency, according to the global sub-table priority map, to the reserved blocks of the last level cache.

Example 9 includes the subject matter of Example 8, and further comprises employing the global sub-table priority map to prioritize a specified packet flow by pre-fetching based on usage frequency.

Example 10 includes the subject matter of Examples 8-9, and further comprises maintaining a plurality of port private maps, the port private maps including a sub-table ranking indicating usage frequency of the classifier sub-tables when switching the packets across a corresponding virtual switch port.

Example 11 includes the subject matter of Examples 8-10, and wherein switching the packets includes employing a plurality of PMD threads corresponding to the ports, and wherein the method further comprises assigning PMD threads a highest class of service to prevent eviction of pre-fetched classifier sub-tables from the reserved blocks of the last level cache by non-PMD threads.

Example 12 includes the subject matter of Example 11, and wherein blocks of the last level cache are reserved by employing a bit mask for each class of service, and wherein the PMD threads are provided access to the reserved blocks by associating the PMD threads with a highest class of service bit mask.

Example 13 includes the subject matter of Example 11, and wherein blocks of the last level cache are reserved by employing a code bit mask and a data bit mask for each class of service, and wherein the PMD threads are provided access to the reserved blocks by: associating the PMD threads with a highest class of service code bit mask, and associating the classifier sub-tables with a highest class of service data bit mask.

Example 14 includes the subject matter of Examples 8-13, and wherein the global sub-table priority map further includes VNF priority, and wherein the sub-set of the classifier sub-tables are pre-fetched according to both usage frequency and VNF priority.

Example 15 includes a non-transitory computer readable storage medium configured to store a computer program product comprising instructions that, when executed, cause a processor to: employ a plurality of PMD threads to switch packets between virtual switch ports based on classifier sub-tables; employ a plurality of non-PMD threads to execute non-switching VNFs; assign PMD threads a higher CoS than the non-PMD threads; reserve blocks of last level cache based on CoS by employing CoS based bit masks; and pre-fetch the classifier sub-tables into the blocks of reserved last level cache to prevent non-PMD threads with lower CoS from evicting the pre-fetched classifier sub-tables associated with the higher CoS PMD threads.

Example 16 includes the subject matter of Example 15, and wherein the classifier sub-tables are selected for pre-fetching based on frequency of use when switching the packets according to corresponding flows.

Example 17 includes the subject matter of Examples 15-16, and wherein the instructions, when executed, further cause the processor to maintain a global sub-table priority map for the classifier sub-tables, the global sub-table priority map indicating usage frequency of the classifier sub-tables when switching the packets between the ports, wherein the classifier sub-tables are selected for pre-fetching according to the global sub-table priority map.

Example 18 includes the subject matter of Example 17, and wherein the global sub-table priority map further includes VNF priority, and wherein the sub-set of the classifier sub-tables are pre-fetched according to both usage frequency and VNF priority.

Example 19 includes the subject matter of Examples 15-18, and wherein the PMD threads are assigned a highest CoS code bit mask and the pre-fetched classifier sub-tables are assigned a highest CoS data bit mask.

Example 20 includes the subject matter of Examples 15-18, and wherein the PMD threads and the pre-fetched classifier sub-tables are assigned a highest CoS bit mask.

Example 21 includes an apparatus comprising: a main data storage means for storing classifier sub-tables for at least one virtual switch; a processing data storage means for storing data during execution; and a processing means for implementing the at least one virtual switch with a plurality of ports, the processing means to: switch packets between the ports based on the classifier sub-tables; reserve reserved blocks of the processing data storage means for classifier sub-table storage; maintain a global sub-table priority map for the classifier sub-tables, the global sub-table priority map indicating usage frequency of the classifier sub-tables when switching the packets between the ports; and pre-fetch a sub-set of the classifier sub-tables with a highest usage frequency, according to the global sub-table priority map, to the reserved blocks of the processing data storage means.

Example 22 includes the subject matter of Example 21, and wherein the processing means is further to maintain a plurality of port private maps, the port private maps including a sub-table ranking indicating usage frequency of the classifier sub-tables when switching the packets across a corresponding port.

Example 23 includes the subject matter of Examples 21-23, and wherein the at least one virtual switch employs a plurality of PMD threads corresponding to the ports for switching the packets, wherein the processing means executes threads based on class of service, and wherein the PMD threads are assigned a highest class of service to prevent eviction of pre-fetched classifier sub-tables from the reserved blocks of the processing data storage means by non-PMD threads.

Example 24 includes the subject matter of Example 23, and wherein blocks of the processing data storage means are reserved by employing a bit mask for each class of service, and wherein the PMD threads are provided access to the reserved blocks by associating the PMD threads with a highest class of service bit mask.

Example 25 includes the subject matter of Example 23, and wherein blocks of the processing data storage means are reserved by employing a code bit mask and a data bit mask for each class of service, and wherein the PMD threads are provided access to the reserved blocks by: associating the PMD threads with a highest class of service code bit mask, and associating the classifier sub-tables with a highest class of service data bit mask.

Example 26 includes the subject matter of Examples 23-25, and wherein processing means is further to dynamically adjust a number of reserved memory blocks for classifier sub-table storage based on flow statistics associated with the switched packets by altering a bit mask associated with the highest class of service assigned to the PMD threads.

Example 27 includes the subject matter of Examples 21-26, and wherein the global sub-table priority map further includes virtual network function (VNF) priority, and wherein the sub-set of the classifier sub-tables are pre-fetched according to both usage frequency and VNF priority.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Although specific embodiments of the invention have been illustrated and described for purposes of illustration, it will be understood that various modifications may be made without departing from the spirit and scope of the invention. Accordingly, the invention should not be limited except as by the appended claims.

We claim:

1. An apparatus comprising:
a main memory to store classifier sub-tables for at least one virtual switch;
a last level cache; and
one or more processor cores to implement the at least one virtual switch with a plurality of ports, the processor cores to:
switch packets between the ports based on the classifier sub-tables;
reserve reserved blocks of the last level cache for classifier sub-table storage;
maintain a global sub-table priority map for the classifier sub-tables, the global sub-table priority map indicating usage frequency of the classifier sub-tables when switching the packets between the ports; and
pre-fetch a sub-set of the classifier sub-tables with a highest usage frequency, according to the global sub-table priority map, to the reserved blocks of the last level cache.

2. The apparatus of claim 1, wherein the processor cores employ a plurality of poll mode driver (PMD) threads corresponding to the ports for switching the packets, wherein the processor cores execute threads based on class of service, and wherein the PMD threads are assigned a highest class of service to prevent eviction of pre-fetched classifier sub-tables from the reserved blocks of the last level cache by non-PMD threads.

3. The apparatus of claim 2, wherein blocks of the last level cache are reserved by employing a bit mask for each class of service, and wherein the PMD threads are provided access to the reserved blocks by associating the PMD threads with a highest class of service bit mask.

4. The apparatus of claim 2, wherein blocks of the last level cache are reserved by employing a code bit mask and a data bit mask for each class of service, and wherein the PMD threads are provided access to the reserved blocks by:
associating the PMD threads with a highest class of service code bit mask, and
associating the classifier sub-tables with a highest class of service data bit mask.

5. The apparatus of claim 2, wherein the processor cores further dynamically adjust a number of reserved memory blocks for classifier sub-table storage based on flow statistics associated with the switched packets by altering a bit mask associated with the highest class of service assigned to the PMD threads.

6. The apparatus of claim 1, wherein the processor cores are further to maintain a plurality of port private maps, the port private maps including a sub-table ranking indicating usage frequency of the classifier sub-tables when switching the packets across a corresponding port.

7. The apparatus of claim 1, wherein the global sub-table priority map further includes virtual network function (VNF) priority, and wherein the sub-set of the classifier sub-tables are pre-fetched according to both usage frequency and VNF priority.

8. A method comprising:
switching packets between virtual switch ports based on classifier sub-tables;
reserving blocks of last level cache for classifier sub-table storage;
maintaining a global sub-table priority map for the classifier sub-tables, the global sub-table priority map indicating usage frequency of the classifier sub-tables when switching the packets between the ports; and
pre-fetching a sub-set of the classifier sub-tables with a highest usage frequency, according to the global sub-table priority map, to the reserved blocks of the last level cache.

9. The method of claim 8, wherein switching the packets includes employing a plurality of poll mode driver (PMD) threads corresponding to the ports, and wherein the method further comprises assigning PMD threads a highest class of service to prevent eviction of pre-fetched classifier sub-tables from the reserved blocks of the last level cache by non-PMD threads.

10. The method of claim 9, wherein blocks of the last level cache are reserved by employing a bit mask for each class of service, and wherein the PMD threads are provided access to the reserved blocks by associating the PMD threads with a highest class of service bit mask.

11. The method of claim 9, wherein blocks of the last level cache are reserved by employing a code bit mask and a data bit mask for each class of service, and wherein the PMD threads are provided access to the reserved blocks by:
associating the PMD threads with a highest class of service code bit mask, and
associating the classifier sub-tables with a highest class of service data bit mask.

12. The method of claim 8, further comprising employing the global sub-table priority map to prioritize a specified packet flow by pre-fetching based on usage frequency.

13. The method of claim 8, further comprising maintaining a plurality of port private maps, the port private maps including a sub-table ranking indicating usage frequency of the classifier sub-tables when switching the packets across a corresponding virtual switch port.

14. A non-transitory computer-readable storage medium configured to store a computer program product comprising instructions that, when executed, cause a processor to:
- employ a plurality of poll mode driver (PMD) threads to switch packets between virtual switch ports based on classifier sub-tables;
- employ a plurality of non-PMD threads to execute non-switching virtual network functions (VNFs);
- assign PMD threads a higher class of service (CoS) than the non-PMD threads;
- reserve blocks of last level cache based on CoS by employing CoS based bit masks; and
- pre-fetch the classifier sub-tables into the blocks of reserved last level cache to prevent non-PMD threads with lower CoS from evicting the pre-fetched classifier sub-tables associated with the higher CoS PMD threads.

15. The non-transitory computer readable storage medium of claim 14, wherein the classifier sub-tables are selected for pre-fetching based on frequency of use when switching the packets according to corresponding flows.

16. The non-transitory computer readable storage medium of claim 14, wherein the PMD threads are assigned a highest CoS code bit mask and the pre-fetched classifier sub-tables are assigned a highest CoS data bit mask.

17. The non-transitory computer readable storage medium of claim 15, wherein the instructions, when executed, further cause the processor to maintain a global sub-table priority map for the classifier sub-tables, the global sub-table priority map indicating usage frequency of the classifier sub-tables when switching the packets between the ports, wherein the classifier sub-tables are selected for pre-fetching according to the global sub-table priority map.

18. The non-transitory computer readable storage medium of claim 14, wherein the PMD threads and the pre-fetched classifier sub-tables are assigned a highest CoS bit mask.

19. An apparatus comprising:
- a main data storage means for storing classifier sub-tables for at least one virtual switch;
- a processing data storage means for storing data during execution; and
- a processing means for implementing the at least one virtual switch with a plurality of ports, the processing means to:
    - switch packets between the ports based on the classifier sub-tables;
    - reserve reserved blocks of the processing data storage means for classifier sub-table storage;
    - maintain a global sub-table priority map for the classifier sub-tables, the global sub-table priority map indicating usage frequency of the classifier sub-tables when switching the packets between the ports; and
    - pre-fetch a sub-set of the classifier sub-tables with a highest usage frequency, according to the global sub-table priority map, to the reserved blocks of the processing data storage means.

20. The apparatus of claim 19, wherein the processing means employs a plurality of poll mode driver (PMD) threads corresponding to the ports for switching the packets, wherein the processing means executes threads based on class of service, and wherein the PMD threads are assigned a highest class of service to prevent eviction of pre-fetched classifier sub-tables from the reserved blocks of the processing data storage means by non-PMD threads.

21. The apparatus of claim 20, wherein blocks of the processing data storage means are reserved by employing a bit mask for each class of service, and wherein the PMD threads are provided access to the reserved blocks by associating the PMD threads with a highest class of service bit mask.

22. The apparatus of claim 20, wherein blocks of the processing data storage means are reserved by employing a code bit mask and a data bit mask for each class of service, and wherein the PMD threads are provided access to the reserved blocks by:
- associating the PMD threads with a highest class of service code bit mask, and
- associating the classifier sub-tables with a highest class of service data bit mask.

23. The apparatus of claim 20, wherein the processing means is further to dynamically adjust a number of reserved memory blocks for classifier sub-table storage based on flow statistics associated with the switched packets by altering a bit mask associated with the highest class of service assigned to the PMD threads.

24. The apparatus of claim 19, wherein the processing means is further to maintain a plurality of port private maps, the port private maps including a sub-table ranking indicating usage frequency of a classifier sub-tables when switching the packets across the corresponding port.

25. The apparatus of claim 19, wherein the global sub-table priority map further includes virtual network function (VNF) priority, and wherein the sub-set of the classifier sub-tables are pre-fetched according to both usage frequency and VNF priority.

* * * * *